(12) United States Patent
Mercuri

(10) Patent No.: US 10,367,719 B2
(45) Date of Patent: *Jul. 30, 2019

(54) OPTIMIZED CONSUMPTION OF THIRD-PARTY WEB SERVICES IN A COMPOSITE SERVICE

(71) Applicant: MICROSOFT TECHNOLOGY LICENSING, LLC, Redmond, WA (US)

(72) Inventor: Marc Mercuri, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/980,067

(22) Filed: May 15, 2018

(65) Prior Publication Data

US 2019/0020571 A1 Jan. 17, 2019

Related U.S. Application Data

(63) Continuation of application No. 14/524,456, filed on Oct. 27, 2014, now Pat. No. 9,979,630, which is a continuation of application No. 12/907,998, filed on Oct. 20, 2010, now Pat. No. 8,874,787.

(51) Int. Cl.
*G06F 9/50* (2006.01)
*H04L 29/08* (2006.01)
*H04L 12/759* (2013.01)

(52) U.S. Cl.
CPC .......... *H04L 45/028* (2013.01); *G06F 9/5055* (2013.01); *H04L 67/16* (2013.01)

(58) Field of Classification Search
CPC ...... H04L 45/028; H04L 29/08; H04L 12/759
See application file for complete search history.

(56) References Cited

U.S. PATENT DOCUMENTS

| 5,768,255 | A | 6/1998 | Brownmiller et al. |
| 6,175,564 | B1* | 1/2001 | Miloslavsky ........ G06Q 10/107 348/E7.082 |
| 7,707,071 | B2 | 4/2010 | Rigole |
| 8,353,012 | B2 | 1/2013 | Del Real |
| 8,707,194 | B1 | 4/2014 | Jenkins et al. |

(Continued)

OTHER PUBLICATIONS

"Amazon Elastic Compute Cloud (Amazon EC2)", Retrieved from: http://web.archive.org/web/20110301214026/http://aws.amazon.com/ec2/, Retrieved on: Feb. 28, 2011, 15 Pages.

(Continued)

*Primary Examiner* — El Hadji M Sall
(74) *Attorney, Agent, or Firm* — Workman Nydegger

(57) ABSTRACT

Technologies are described herein for routing a service request to an appropriate web service. A first service request is routed from a first web service to a second web service. Routing factors associated with the second web service are monitored. A determination is made as to whether the routing factors indicate that the second web service is no longer appropriate for handling service requests. If the routing factors indicate that the first web service is no longer appropriate for handling service requests, then a second service request is routed from the first web service to a third web service. The first web service, the second web service, and the third web service are included in a composite service.

20 Claims, 3 Drawing Sheets

(56) References Cited

U.S. PATENT DOCUMENTS

| | | | |
|---|---|---|---|
| 8,847,784 B2 | 9/2014 | Ree et al. | |
| 9,215,264 B1 | 12/2015 | Sokolov et al. | |
| 2002/0178259 A1* | 11/2002 | Doyle | H04L 29/06 709/225 |
| 2004/0243588 A1 | 12/2004 | Tanner et al. | |
| 2011/0131316 A1 | 6/2011 | Ferris et al. | |
| 2011/0131335 A1 | 6/2011 | Spaltro et al. | |
| 2012/0226808 A1 | 9/2012 | Morgan | |
| 2015/0113167 A1 | 4/2015 | Mercuri | |

OTHER PUBLICATIONS

"Microsoft Windows Azure", Retrieved from: https://web.archive.org/web/20100923184938/http://www.microsoft.com/windowsazure/windowsazure, Retrieved Date: Sep. 23, 2010, 3 Pages.

"Final Office Action Issued in U.S. Appl. No. 14/458,965", dated Feb. 4, 2016, 5 Pages. (MS#330467-US-CNT).

"Final Office Action Issued in U.S. Appl. No. 14/524,456", dated Aug. 7, 2017, 6 Pages. (MS#330471-US-CNT).

"Non-final Office Action Issued in U.S. Appl. No. 14/524,456", dated Jan. 27, 2017, 12 Pages. (MS#330471-US-CNT).

Shue, David, "Multi-Tenant Resource Allocation for Shared Cloud Storage", In Doctoral Dissertation Submitted to the Faculty of Princeton University for the degree of Doctor of Philosophy, Computer Science Department, Jun. 1, 2014, 138 Pages.

\* cited by examiner

OPTIMIZED CONSUMPTION OF THIRD-PARTY WEB SERVICES IN A COMPOSITE SERVICE

CROSS-REFERENCE TO RELATED APPLICATIONS

This application is a continuation of U.S. patent application Ser. No. 14/524,456 filed on Oct. 27, 2014, entitled "Optimized Consumption of Third-Party Web Services in a Composite Service," which issued as U.S. Pat. No. 9,979,630 on May 22, 2018, which is a continuation of U.S. patent application Ser. No. 12/907,998 filed on Oct. 20, 2010, entitled "OPTIMIZED CONSUMPTION OF THIRD-PARTY WEB SERVICES IN A COMPOSITE SERVICE," which issued as U.S. Pat. No. 8,874,787 on Oct. 28, 2014. The foregoing applications are incorporated herein by reference in their entireties.

BACKGROUND

Conventional software applications have generally been installed and executed in a localized computing environment, such as a desktop or enterprise environment. The advancement of increasingly powerful computing devices and expanding data storage capacity in large scale networked data centers has moved consumer and business-oriented applications away from local computing environments to computing environments provided over the Internet or other types of networks, commonly referred to as "cloud-based" computing environments. These applications may be offered as hosted services in the cloud-based computing environment.

As the Internet continues to grow, service providers may continue to offer more diverse hosted services. These hosted services may be offered at various levels, including end user services and various backend services. For example, a hosted service may offer one level of service to one hosted service and offer another level of service to another hosted service. The various levels of service may refer to different allocations of resources, such as processing resources, memory resources, networking resources, and/or the like. Combining these hosted services can yield a composite service. It is difficult, however, to integrate multiple levels of hosted services, especially when these hosted services are offered by different service providers.

It is with respect to these considerations and others that the disclosure made herein is presented.

BRIEF SUMMARY

Technologies are described herein for optimizing consumption of third party web services. A composite service may include multiple World Wide Web ("web") services. Each web service may be a consuming service and/or a consumed service. A consuming web service may "consume" a consumed web service in that the consuming web service may route service requests to the consumed web service and utilize functionality provided by the consumed web service in response to the service requests. The service requests may include requests for information (e.g., retrieve requested information) and requests for action (e.g., perform requested action).

Through the utilization of the technologies and concepts presented herein, a consuming web service may be configured to optimize consumption of consumed web service services. The consumed web services may provide a common functionality, which is consumed by the consuming web service. The consuming web service and its corresponding consumed web services may be controlled and/or operated by different entities. The consuming web service may select one of the consumed services to route a service request based on various business rules adapted to reduce cost, increase efficiency, and endure continuity of service of the consuming web service. The consuming web service may then route the service request to the selected consumed service, which can respond to the service request. The business rules may guide the consuming service to selecting the consumed service based on various real-time or near real-time routing factors, such as service availability, variable pricing, a number of service requests handled, response times, and the like.

Example technologies may provide for routing a service request to an appropriate web service. The technologies route a first service request from a first web service to a second web service. The technologies monitor routing factors associated with the second web service. The technologies determine whether the routing factors indicate that the second web service is no longer appropriate for handling service requests. If the routing factors indicate that the first web service is no longer appropriate for handling service requests, then the technologies route a second service request from the first web service to a third web service. The first web service, the second web service, and the third web service are included a composite service.

It should be appreciated that the above-described subject matter may also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
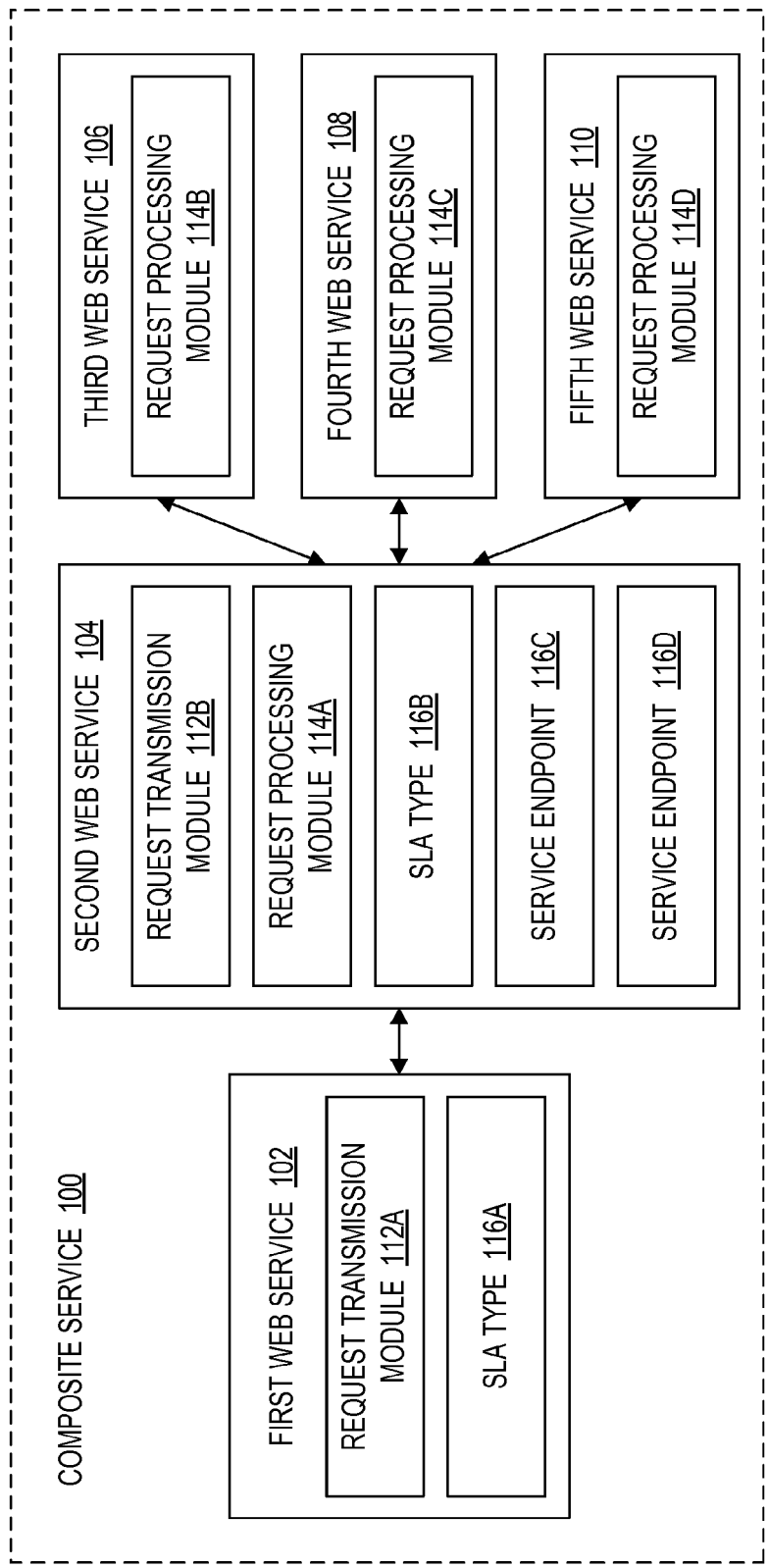
FIG. 1 is a block diagram illustrating a composite service adapted to route a service request to an appropriate web service, in accordance with some embodiments.

The following detailed description is directed to technologies for optimizing consumption of third-party web services. A consuming web service may be configured to initially route service requests to a first consumed web service in accordance with a predetermined order. The consuming web service may monitor real-time or near real-time routing factors, such as service availability, variable pricing, a number of requests handled, and response times, associated with the consuming web service.

The consuming web service may evaluate the monitored routing factors according to business rules in order to determine whether the first consumed web service is no longer appropriate for responding to service requests. The business rules may be adapted to reduce cost, increase efficiency, and ensure continuity of service of the consuming web service. When the consuming web service determines that the first consumed web service is no longer appropriate for responding to service requests, the consuming web service may temporarily route service requests to a second consumed web service in accordance with the predetermined order. The consuming web service may continue to monitor routing factors of the currently utilized consumed web service and further route service requests to other consumed web services, as necessary, according to the predetermined order.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration, specific embodiments, or examples. Referring now to the drawings, in which like numerals represent like elements through the several figures, a computing system and methodology for optimizing consumption of third-party web services will be described.

FIG. 1 illustrates a composite service 100 adapted to route a service request to an appropriate web service, in accordance with some embodiments. The composite service 100 may include a first web service 102, a second web service 104, a third web service 106, a fourth web service 108, and a fifth web service 110. The web services 102-110 may be coupled via a communications network, such as the network 318 illustrated in FIG. 3. An example of the composite service 100 is the monitoring service described in U.S. patent application Ser. No. 12/900,481, filed Oct. 8, 2010, entitled "Providing a Monitoring Service in a Cloud-Based Computing Environment," which is hereby incorporated by reference in its entirety. Some examples of the web services 102-110 include the various web services (e.g., controller application, monitor application, finder application, analyzer application, notifier application, etc.) also described in the above referenced and incorporated patent application entitled "Providing a Monitoring Service in a Cloud-Based Environment."

The first web service 102 may include a request transmission module 112A and a SLA type 116A. The second web service 104 may include a request transmission module 112B, a request processing module 114A, and SLA types 116B-116D. The third web service 106 may include a request processing module 114B. The fourth web service 108 may include a request processing module 114C. The fifth web service 110 may include a request processing module 114D. The request transmission modules 112A-112B may be collectively referred to as request transmission modules 112. The request processing modules 114A-114D may be collectively referred to as request processing modules 114. The SLA types 116A-116D may be collectively referred to as SLA types 116.

According to various embodiments, a consuming web service may be configured to "consume" a consumed web service in that the consuming web service may request and utilize functionality provided by the consumed web service. In particular, the consuming web service may send a service request to the consumed web service. The consumed web service may then respond to the service request. If the service request is a request for information (e.g., a request for retrieve product information), then the consumed web service may respond to the service request by retrieving the requested information and sending the requested information to the consuming web service. If the service request is a request for an action (e.g., a request to notify a user), then the consumed web service may respond to the service request by performing the action and sending an acknowledgement of the action to the consuming web service.

In the example illustrated in FIG. 1, the first web service 102 may consume the second web service 104. As a result, with respect to the first web service 102 and the second web service 104, the first web service 102 may be a consuming web service, and the second web service 104 may be a consumed web service. Further, the second web service 104 may consume the third web service 106, the fourth web service 108, and/or the fifth web service 110. As a result, with respect to the second web service 104, the third web service 106, the fourth web service 108, and the fifth web service 110, the second web service 104 may be a consuming web service, and the third web service 106, the fourth web service 108, and the fifth web service 110 may be consumed web services. The third web service 106, the fourth web service 108, and the fifth web service 110 may include similar or overlapping functionality adapted to respond to the service requests from the second web service 104.

According to various embodiments, the first web service 102 may be configured to transmit service requests to the second web service 104, which is configured to respond to the service requests. The level of service provided by the second web service 104 to the first web service 102 may be specified by the SLA type 116A. In order to respond to the service requests from the first web service 102, the second web service 104 may transmit additional service requests to the third web service 106, the fourth web service 108, and/or the fifth web service 110, which respond to the additional service requests. The levels of service provided by the third web service 106, the fourth web service 108, and the fifth web service 110 may be specified by the SLA types 116B-116D, respectively. A higher level of service may correspond to a greater allocation of resources, while a lower level of service may correspond to a lower allocation of resources. Such resources may include hardware, software, and/or networking resources.

The request transmission module 112B in the second web service 104 may be configured to initially route service requests to the request processing module 114B in the third web service 106. For example, the second web service 104 may utilize consumed web services in a specified order, and the third web service 106 may be the first listed web service in the specified order. The request transmission module 112B may also be configured to monitor various real-time or near real-time routing factors associated with the request processing module 114B in order to determine whether the third web service 106 is appropriate for responding to service requests. If the monitored routing factors indicate that the third web service 106 is no longer appropriate, then the first web service 102 may temporarily route service requests to other consumed web services, such as the fourth web service 108 or the fifth web service 110.

In a first embodiment, the monitored routing factors may indicate that the third web service 106 will be offline within a specified time frame. For example, the third web service 106 may broadcast a message specifying a time frame during which the third web service 106 will be unavailable for maintenance or upgrade. Further, the SLA type 116A may specify a minimum availability of service that the second web service 104 is desired or required to provide the first web service 102. In order to ensure this minimum availability of service, the request transmission module 112B in the second web service 104 may route service requests to the request processing module 114C in the fourth web service 108 during the specified time frame. For example, the fourth web service 108 may be the second listed web service in the specified order.

When the request transmission module 112B routes service requests to the fourth web service 108, the request transmission module 112B may monitor additional real-time or near real-time routing factors associated with the request processing module 114C in order to determine whether the fourth web service 108 is appropriate for responding to service requests. If the monitored additional routing factors indicate that the fourth web service 108 is not available during at least part of the specified time frame, then the request transmission module 112B may route the service requests to the request processing module 114D in the fifth web service 110. For example, the fifth web service 110 may be the third listed web service in the specified order. When the specified time frame passes, the request transmission module 112B may route service requests back to the request processing module 114B.

In a second embodiment, the monitored routing factors may indicate that the third web service 106 offers variable pricing at different times. That is, an operator of the second web service 104 may pay a different fee, depending on the time, to utilize the third web service 106. For example, the third web service 106 may offer higher pricing during peak hours (e.g., business hours during a weekday) and lower pricing during off-peak hours. In this case, the request transmission module 112B may route service requests to the request processing module 114C and/or the request processing module 114D during higher fee time periods where the fees for the fourth web service 108 and/or the fifth web service 110 are lower than the fees for the third web service 106. Between the fourth web service 108 and the fifth web service 110, the request transmission module 112B may select the web service having the lowest fees during the higher fee time periods and/or based on other suitable criteria (e.g., bandwidth, availability, responsiveness, etc.). The request transmission module 112B may route service requests back to the third web service 106 during lower fee time periods where the fees for the third web service 106 are lower than the fees for the fourth web service 108 and the fifth web service 110.

In a third embodiment, the monitored routing factors may indicate that the third web service 106 can handle only a limited number of service requests per unit of time. For example, the SLA type 116B between the second web service 104 and the third web service 106 may specify a first limit of service requests. When the first limit has been reached on the third web service 106, the request transmission module 112B may route service requests to the request processing module 114C according to the specified order. The SLA 116C type between the second web service 104 and the fourth web service 108 may specify a second limit of service requests. When the second limit has been reached on the fourth web service 108, the request transmission module 112B may route service requests to the request processing module 114D according to the specified order. The second web service 104 may route service requests back to the request processing module 114B when the first limit resets.

In a fourth embodiment, the monitored routing factors may indicate that the third web service 106 is non-responsive for a period of time. For example, response times for the third web service 106 may exceed a threshold that adversely affects whether the second web service 104 can meet responsiveness desires or requirements specified by the SLA type 116A. In this case, the request transmission module 112B may route service requests to the request processing module 114C according to the specified order. The request transmission module 112B may monitor additional real-time or near real-time routing factors associated with the request processing module 114C. If monitored additional routing factors indicate that the fourth web service 108 is non-responsive within a period of time, then the request transmission module 112B may route service requests to the request processing module 114D according to the specified order. The request transmission module 112B may route service requests back to the request processing module 114B when it is found to be responsive. In other embodiments, the monitor routing factors may indicate any suitable criteria indicating changes in cost, efficiency, or continuity of service.

Figure 2:
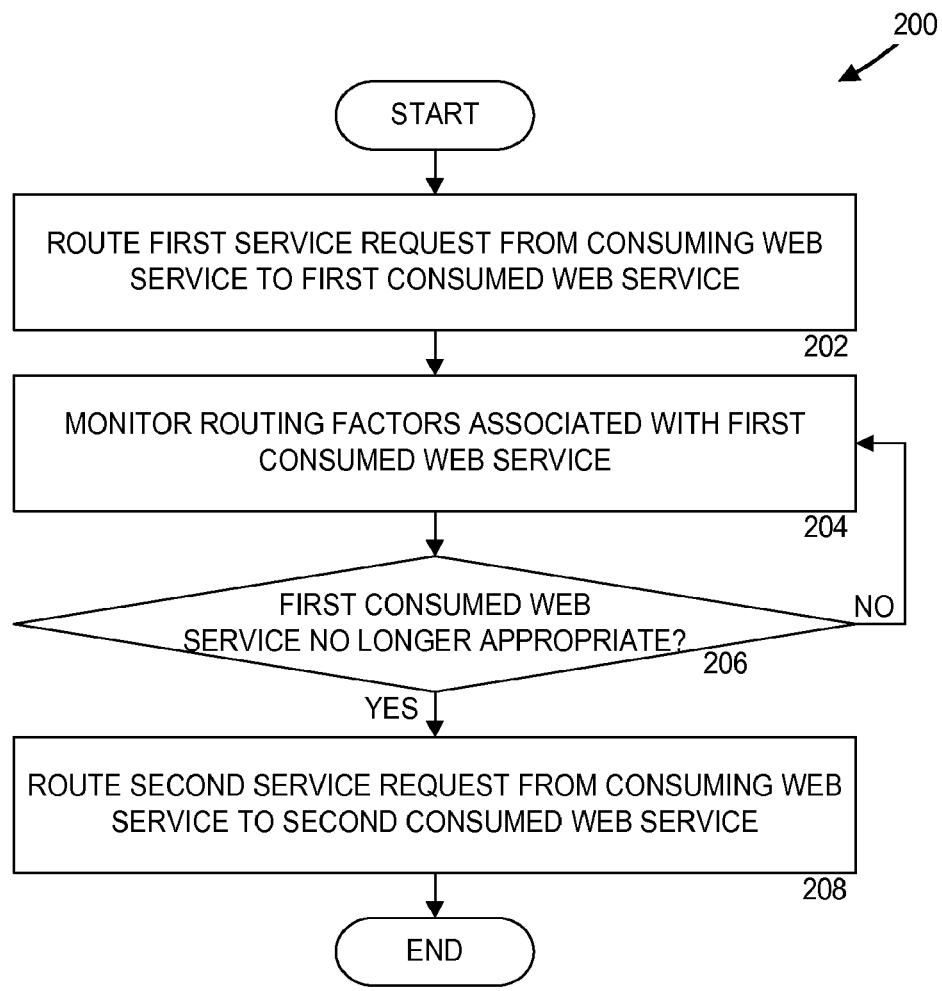
FIG. 2 is a flow diagram illustrating a method for routing a service request to an appropriate web service, in accordance with some embodiments.

Referring now to FIG. 2, additional details regarding the operations of the request transmission modules 112 and the request processing modules 114 will be provided. In particular, FIG. 2 is a flow diagram illustrating a method for routing a service request to an appropriate web service, in accordance with some embodiments. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

In FIG. 2, a routine 200 begins at operation 202, where a request transmission module, such as the request transmission module 112B, routes a first service request from a consuming web service, such as the second web service 104, to a first consumed web service, such as the third web service 106. For example, the second web service 104 may be the first listed consumed web service in a specified order. The request processing module 114B may receive the first service request and respond to the first service request. If the first service request is a request for information, the request processing module 114B may respond to the first service request by retrieving the information and providing the information to the second web service 104. If the first service request is a request for action, the request processing module 114B may perform the action and provide an acknowledgement of the performance to the second web service 104. When the request transmission module 112B routes the first service request from the second web service 104 to the third web service 106, the routine 200 may proceed to operation 204.

At operation 204, the request transmission module 112B monitors routing factors associated with the third web service 106. The routing factors may indicate whether the third web service 106 is no longer appropriate for handling service requests. The routing factors may be real-time or near real-time. In a first embodiment, the routing factors may include availability of the third web service 106. For example, the third web service 106 may not be available or not operational during a particular time frame. In a second embodiment, the routing factors may include variable pricing of the third web service 106. For example, the third web service 106 may charge a higher fee for service during peak hours and a lower fee for service during off-peak hours.

In a third embodiment, the routing factors may include a number of service requests handled by the third web service 106. For example, the number of service requests handled by the third web service 106 may exceed a threshold specified in the SLA type 116B between the second web service 104 and the third web service 106. In a fourth embodiment, the routing factors may include response times of the third web service 106 responding to previous service requests. For example, the response times may exceed a threshold that affects whether the second web service 104 can meet responsiveness expectations or requirements of the SLA type 116A between the first web service 102 and the second web service 104. In other embodiments, the monitor routing factors may indicate any suitable criteria indicating changes in cost, efficiency, or continuity of service. When the request transmission module 112B monitors routing factors associated with the third web service 106, the routine 200 may proceed to operation 206.

At operation 206, the request transmission module 112B may determine whether the third web service 106 is no longer appropriate for handling service requests based on the routing factors. In a first embodiment, the request transmission module 112B may determine that the third web service 106 is no longer appropriate for handling service requests during the particular time frame when the third web service 106 is not available. In a second embodiment, the request transmission module 112B may determine that the third web service 106 is no longer appropriate for handling service requests during peak hours when the third web service 106 charges a higher fee.

In a third embodiment, the request transmission module 112B may determine that the third web service 106 is no longer appropriate for handling service requests when the number of service requests handled by the third web service 106 exceeds the threshold specified in the SLA type 116B. In a fourth embodiment, the request transmission module 112B may determine that the third web service 106 is no longer appropriate for handling service requests when the response times of the third web service 106 exceeds a threshold that affects whether the second web service 104 can meet responsiveness expectations or requirements of the SLA type 116A. In other embodiments, the request transmission module 112B may determine that the third web service 106 is no longer appropriate for handling service requests when the routing factors indicate increases in cost, reductions in efficiency, and/or interruptions in continuity of service.

If the request transmission module 112B determines that the third web service 106 is appropriate for handling service requests based on the routing factors, then the routine 200 may proceed back to operation 204, where the request transmission module 112B continues to monitor the routing factors associated with the third web service 106. If the request transmission module 112B determines that the third web service 106 is no longer appropriate for handling service requests based on the routing factors, then the routine 200 may proceed to operation 208. At operation 208, the request transmission module 112B may route a second service request to the fourth web service 108. For example, the fourth web service 108 may be the second listed web service in the specified order. The routine 200 may repeat (e.g., periodically, continuously, or on demand as needed) or terminate.

Figure 3:
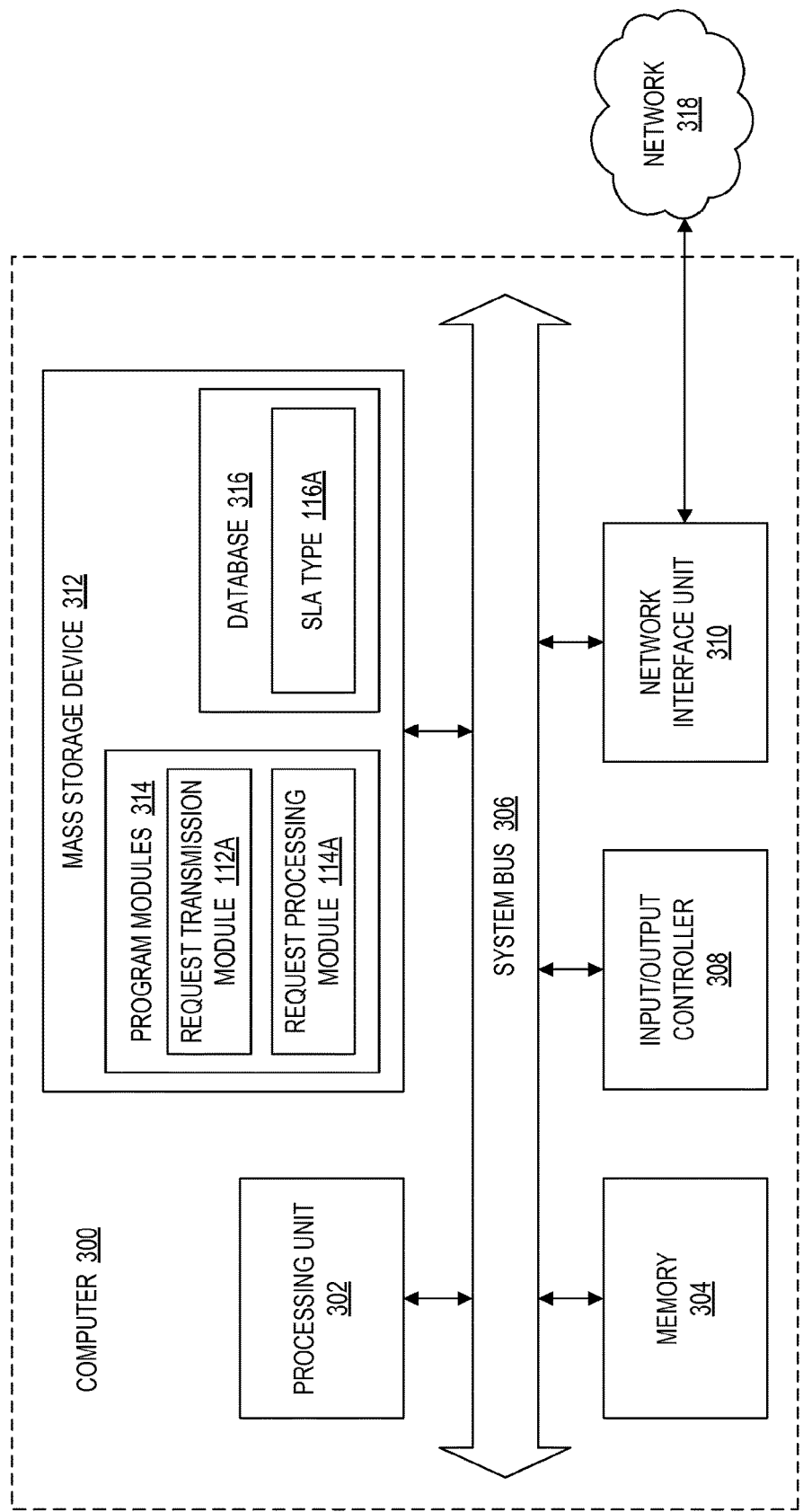
FIG. 3 is a computer architecture diagram showing an illustrative computer hardware architecture for a computing system capable of implementing the embodiments presented herein.

Turning now to FIG. 3, an example computer architecture diagram showing a computer 300 is illustrated. The computer 300 may include a central processing unit 302, a system memory 304, and a system bus 306 that couples the memory 304 to the 302. The computer 300 may further include a mass storage device 312 for storing one or more program modules 314 and the database 316. Examples of the program modules 314 may include the request transmission module 112A and the request processing module 114A. The database 316 may store relevant information for the SLA type 116A. The mass storage device 312 may be connected to the processing unit 302 through a mass storage controller (not shown) connected to the bus 306. The mass storage device 312 and its associated computer-storage media may provide non-volatile storage for the computer 300. Although the description of computer-storage media contained herein refers to a mass storage device, such as a hard disk or CD-ROM drive, it should be appreciated by those skilled in the art that computer-storage media can be any available computer storage media that can be accessed by the computer 300.

By way of example, and not limitation, computer-storage media may include volatile and non-volatile, removable and non-removable media implemented in any method or technology for the non-transitory storage of information such as computer-storage instructions, data structures, program modules, or other data. For example, computer-storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 300.

According to various embodiments, the computer 300 may operate in a networked environment using logical connections to remote computers through a network such as the network 318. The computer 300 may connect to the network 318 through a network interface unit 310 connected to the bus 306. It should be appreciated that the network interface unit 310 may also be utilized to connect to other types of networks and remote computer systems. The computer 300 may also include an input/output controller 308 for receiving and processing input from a number of input devices (not shown), including a keyboard, a mouse, a microphone, and a game controller. Similarly, the input/ output controller 308 may provide output to a display or other type of output device (not shown).

The bus 306 may enable the processing unit 302 to read code and/or data to/from the mass storage device 312 or other computer-storage media. The computer-storage media may represent apparatus in the form of storage elements that are implemented using any suitable technology, including but not limited to semiconductors, magnetic materials, optics, or the like. The computer-storage media may represent memory components, whether characterized as RAM, ROM, flash, or other types of technology. The computer-storage media may also represent secondary storage, whether implemented as hard drives or otherwise. Hard drive implementations may be characterized as solid state, or may include rotating media storing magnetically-encoded information.

The program modules 314 may include software instructions that, when loaded into the processing unit 302 and executed, cause the computer 300 to route a service request to an appropriate web service. The program modules 314 may also provide various tools or techniques by which the computer 300 may participate within the overall systems or operating environments using the components, flows, and data structures discussed throughout this description. For example, the program modules 314 may implement interfaces for routing a service request to an appropriate web service.

In general, the program modules 314 may, when loaded into the processing unit 302 and executed, transform the processing unit 302 and the overall computer 300 from a general-purpose computing system into a special-purpose computing system customized to route a service request to an appropriate web service. The processing unit 302 may be constructed from any number of transistors or other discrete circuit elements, which may individually or collectively assume any number of states. More specifically, the processing unit 302 may operate as a finite-state machine, in response to executable instructions contained within the program modules 314. These computer-executable instructions may transform the processing unit 302 by specifying how the processing unit 302 transitions between states, thereby transforming the transistors or other discrete hardware elements constituting the processing unit 302.

Encoding the program modules 314 may also transform the physical structure of the computer-storage media. The specific transformation of physical structure may depend on various factors, in different implementations of this description. Examples of such factors may include, but are not limited to: the technology used to implement the computer-storage media, whether the computer-storage media are characterized as primary or secondary storage, and the like. For example, if the computer-storage media are implemented as semiconductor-based memory, the program modules 314 may transform the physical state of the semiconductor memory, when the software is encoded therein. For example, the program modules 314 may transform the state of transistors, capacitors, or other discrete circuit elements constituting the semiconductor memory.

As another example, the computer-storage media may be implemented using magnetic or optical technology. In such implementations, the program modules 314 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present description, with the foregoing examples provided only to facilitate this discussion.

Based on the foregoing, it should be appreciated that technologies for routing a service request to an appropriate web service are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for routing service requests, the method comprising computer-implemented operations for:
   routing a first service request from a first web service to a second web service, wherein the first web service consumes the second web service;
   identifying routing factors associated with the second web service;
   based at least in part on the identified routing factors associated with the second web service, temporarily routing second service requests from the first web service to a third web service for a time frame, wherein the first web service, the second web service, and the third web service are in a composite service, and wherein the first web service consumes the third web service; and
   routing a third service request from the first web service to the second web service after the time frame passes.

2. The computer-implemented method of claim 1, further comprising monitoring the routing factors associated with the second web service.

3. The computer-implemented method of claim 2, wherein monitoring the routing factors associated with the second web service comprises monitoring service availability of the second web service, and wherein the routing factors indicate that the second web service is not available to handle the service requests during the time frame.

4. The computer-implemented method of claim 3, wherein determining that the service availability of the second web service indicates that the second web service is not available to handle the service requests during the time frame comprises:
   receiving a message from the second web service specifying the time frame during which the second web service is not operational.

5. The computer-implemented method of claim 2, wherein monitoring the routing factors associated with the second web service comprises monitoring variable pricing of the second web service, and wherein the routing factors indicate that the second web service offers higher pricing than the third web service during the time frame.

6. The computer-implemented method of claim 2, wherein monitoring the routing factors associated with the second web service comprises monitoring a number of service requests handled by the second web service, and wherein the routing factors indicate that the number of service requests exceed a threshold number of service requests.

7. The computer-implemented method of claim 6, wherein:
the threshold number of service requests is specified in a service level agreement between the first web service and the second web service as a limit of service requests per unit time; and
the time frame corresponds to a time when the limit of service requests per unit time resets.

8. A computer system, comprising:
at least one processor;
a memory communicatively coupled to the processor; and
stored computer-executable instructions stored in memory and which are executable by the at least one processor to cause the computer system to implement a method that includes the following:
routing a first service request from a first web service to a second web service, wherein the first web service consumes the second web service,
identifying routing factors associated with the second web service;
based at least in part on the identified routing factors associated with the second web service, temporarily routing second service requests from the first web service to a third web service for a time frame, wherein the first web service, the second web service, and the third web service are in a composite service, and wherein the first web service consumes the third web service, and
routing a third service request from the first web service to the second web service after the time frame passes.

9. The computer system of claim 8, further comprising monitoring the routing factors associated with the second web service.

10. The computer system of claim 9, wherein monitoring routing factors associated with the second web service comprises monitoring a response time of the second web service, and wherein the method further includes determining that the routing factors indicate that the second web service is no longer appropriate for handling the service requests by determining that the response time of the second web service indicates that the second web service is no longer appropriate for handling the service requests.

11. The computer system of claim 10, wherein determining that the response time of the second web service indicates that the second web service is no longer appropriate for handling the service requests comprises:
determining that the response time exceeds a threshold; and
upon determining that the response time exceeds the threshold, determining that the response time indicates that the second web service is no longer appropriate for handling the service requests.

12. The computer system of claim 8, wherein the first service request comprises a request for information, and wherein the second web service is adapted to retrieve the information and provide the information to the first web service in response to the request.

13. The computer system of claim 8, wherein the first service request comprises a request to perform an action, and wherein the second web service is adapted to perform the action and provide an acknowledgement to the first web service in response to the request.

14. The computer system of claim 8, further comprising, prior to routing the third service request from the first web service to the second web service:
determining that additional routing factors indicate that the third web service is no longer appropriate for handling the service requests; and
routing a fourth service request from the first web service to a fourth web service, the fourth web service in the composite service, wherein the first web service consumes the fourth web service.

15. A hardware storage device having computer-executable instructions stored thereon which are executable by one or more processors of a computer system to cause the computer system to:
route a first service request from a first web service to a second web service, wherein the first web service consumes the second web service;
identifying routing factors associated with the second web service;
based at least in part on the identified routing factors associated with the second web service, temporarily route second service requests from the first web service to a third web service for a time frame, wherein the first web service consumes the third web service; and
route a third service request from the first web service to the second web service after the time frame passes.

16. The hardware storage device of claim 15, further comprising computer executable instruction to:
cause the computer system to monitor the routing factors associated with the second web service by monitoring variable pricing of the second web service; and
cause the computer system to determine whether the routing factors indicate that the second web service is no longer appropriate for handling the service requests by determining whether the variable pricing of the second web service indicates that the second web service is no longer appropriate for handling the service requests.

17. The hardware storage device of claim 15, further comprising computer executable instruction to:
cause the computer system to monitor the routing factors associated with the second web service by monitoring a number of service requests handled by the second web service; and
cause the computer system to determine whether the routing factors indicate that the second web service is no longer appropriate for handling the service requests by determining whether the number of service requests indicates that the second web service is no longer appropriate for handling the service requests.

18. The hardware storage device of claim 15, further comprising computer executable instruction to:
cause the computer system to monitor the routing factors associated with the second web service by monitoring a response time of the second web service; and
cause the computer system to determine whether the routing factors indicate that the second web service is no longer appropriate for handling the service requests by determining whether the response time of the second web service indicates that the second web service is no longer appropriate for handling the service requests.

19. The hardware storage device of claim 15, wherein determining whether the routing factors indicate that the second web service is no longer appropriate for handling the service requests comprises determining whether the routing factors indicate that the second web service is no longer appropriate for handling service requests based on business rules adapted to reduce cost, increase efficiency, and ensure continuity of service.

20. The computer-implemented method of claim 5, further comprising determining that the second web service offers lower pricing than the third web service after the time frame, wherein routing the third service request from the first web service to the second web service after the time frame passes is based at least in part on the determining that the second web service offers the lower pricing than the third web service after the time frame.

* * * * *